(12) United States Patent
Landers et al.

(10) Patent No.: US 6,450,223 B1
(45) Date of Patent: Sep. 17, 2002

(54) PNEUMATIC TIRE HAVING IMPROVED WET TRACTION

(75) Inventors: Samuel Patrick Landers, Uniontown, OH (US); Billy Joe Ratliff, Jr., Akron, OH (US); Craig David Miller, Norton, OH (US); John Kevin Clark, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/575,928

(22) Filed: May 23, 2000

(51) Int. Cl.$^7$ .................... B60C 11/13; B60C 1/00; B60C 101/00; B60C 103/04; B60C 107/00
(52) U.S. Cl. ................. 152/209.5; 152/209.9; 152/209.26; 152/209.28; 152/903
(58) Field of Search ............... 152/209.8, 209.9, 152/209.5, 209.26, 209.27, 209.28, 209.18, 209.15, 903, 546; D12/514, 546, 581

(56) References Cited

U.S. PATENT DOCUMENTS

| | | | |
|---|---|---|---|
| 4,319,620 A | * | 3/1982 | Knill |
| 5,222,537 A | * | 6/1993 | Saito et al. |
| 5,327,952 A | * | 7/1994 | Glover et al. |
| 5,329,980 A | * | 7/1994 | Swift et al. |
| 5,337,815 A | * | 8/1994 | Graas |
| 5,450,885 A | * | 9/1995 | Hanya |
| 5,503,206 A | | 4/1996 | Consolacion et al. |
| 5,603,785 A | * | 2/1997 | Weber et al. |
| 5,639,321 A | * | 6/1997 | Sakamoto et al. |
| 5,733,393 A | * | 3/1998 | Hubbell et al. |
| D405,732 S | * | 2/1999 | Johenning et al. |
| 5,957,179 A | | 9/1999 | Graas |

FOREIGN PATENT DOCUMENTS

| | | | |
|---|---|---|---|
| DE | 19545322 | * | 6/1996 |
| EP | 0600177 | | 6/1994 |
| EP | 710577 | * | 5/1996 |
| EP | 773117 | * | 5/1997 |
| JP | 3-132402 | * | 6/1991 |

OTHER PUBLICATIONS

Tire Review, p. 12, Sep. 1993.*
"Announcement" Revenue Automobile, Hallwag S.A. Bernie, CH, vol. 89, No. 13, Mar. 24, 1994, p. 17, XP0043077 ISSN: 0035–0761.

* cited by examiner

*Primary Examiner*—Steven D. Maki
(74) *Attorney, Agent, or Firm*—David E. Wheeler; Nancy T. Krawczyk (57) ABSTRACT

A pneumatic tire having improved wet traction has two annular aquachannels. The tire has a wide, substantially square footprint, a distinctive tread pattern, and a new tread compound, and exhibits good QGL wet traction in addition to excellent hydroplaning properties. The tire also has good handling and wear properties.

15 Claims, 6 Drawing Sheets

PNEUMATIC TIRE HAVING IMPROVED WET TRACTION

BACKGROUND OF THE INVENTION

The invention relates to pneumatic tires which have improved wet traction and wet stopping and handling characteristics.

Hydroplaning of tires on wet pavement has long been a problem in the art. A tire hydroplanes when running on wet pavement because the tire pushes water in front of it as it advances, until the backpressure of the water is sufficient to lift the tire off the road. The pressure of the water is a function of the depth of the water and the speed of the tire. Various tire designs, adapted to channel water away from the tire, and thereby maintain rubber contact with the road, have been tried by the prior art to correct this problem. Although prior art rain tire designs have improved wet traction, it is a continuing goal in the art to further improve wet traction.

Traction on wet pavement, i.e. pavement that is moistened as opposed to having standing water, known as QGL wet traction (Government standard "Quality Grade Labeling"), is also an important characteristic for a tire.

Often, a tire designed for hydroplaning characteristics has diminished QGL wet traction characteristics because of the low net to gross usually associated with tires designed for hydroplaning properties. Conversely, a tire with good QGL wet traction usually has diminished hydroplaning properties, because of the high net to gross associated with tires designed for QGL wet traction.

It is an object of the present invention to provide a pneumatic tire having improved wet traction, both for hydroplaning and QGL, while having good handling, wet stopping ability, and improved noise and improved wear and irregular wear characteristics.

Other objects of the invention will be apparent from the following description and claims.

DEFINITIONS

"Aquachannel" refers to an extra wide circumferential groove with angled (non parallel), rounded groove walls designed specifically to channel water out of the footprint contact patch of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Contact Patch" refers to a section of footprint, in a footprint that is divided into sections by wide void areas, that maintains contact with the ground.

"Crown" refers to the circumferentially outermost portion of the carcass substantially within the width limits of the tread.

"Design rim" means a rim having a specified configuration and width.

"Directional tread" refers to a tread design which has a preferred direction of rotation in the forward direction of travel.

"Equatorial plane (EP)" means the plane perpendicular to the tire's axis of rotation and passing through the center of its tread.

"Footprint" means the contact patch or area of contact of the tire tread with a flat surface at zero speed and under design load and pressure.

"Footprint Net-to-gross" refers to the actual footprint of a deflected tire and is the ratio of the ground contacting surface area of the tread to the total tread footprint area including the groove void area.

"Groove" means an elongated void area in a tread that may extend circumferentially or laterally about the tread in a straight, curved, or zig-zag manner. Grooves ordinarily remain open in the tire footprint. Circumferentially and laterally extending grooves sometimes have common portions and may be subclassified as "wide" or "narrow". Grooves may be of varying depths in a tire. If such narrow or wide grooves are of substantially reduced depth as compared to wide circumferential grooves which they interconnect, they are regarded as forming "tie bars" tending to maintain a rib-like character in the tread region involved.

"Lugs" refer to discontinuous radial rows of tread rubber in direct contact with the road surface.

"Net-to-gross" refers to the ratio of the ground-contacting surface of a tread to the total tread area.

"Normal load and inflation pressure" refers to the specific design inflation pressure and load assigned by the appropriate standards organization for the design rim and service condition for a tire of specific size. Examples of standards are the Tire and Rim Association Manual and the European Tire and Rim Technical Organization.

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial" and "radially" are used to mean directions radially toward or away from the axis of rotation of the tire.

"Rib" means a circumferentially extending strip of rubber on the tread which is defined by at least one circumferential "wide groove" and either a second such groove or a lateral edge of the tread, the strip of rubber being laterally undivided by full-depth narrow or wide grooves.

"Shoulder" refers to the upper portion of sidewall just below the tread edge.

"Sidewall" means that component which comprises a portion of the outside surface of a tire between the tread and the bead.

"Sipes" refer to small slots molded into ribs of a tire that subdivide the tread surface and improves traction characteristics. Sipes tend to close completely in a tire footprint.

"Slots" are elongated void areas formed by steel blades inserted into a cast or machined mold or tread ring. Slots ordinarily remain open in a tire footprint. In the appended drawings, slots are illustrated by single lines because they are so narrow.

"Tread" means a molded rubber component which, when bonded to a tire casing, includes that portion of the tire that comes into contact with the road when the tire is normally inflated and under normal load.

"Tread width" means the arc length of the road contacting tread surface in the axial direction, that is, in a plane parallel to the axis of rotation of the tire.

"Turn-up ply" refers to an end of a carcass ply that wraps around one bead only.

SUMMARY OF THE INVENTION

A pneumatic tire for use on paved surfaces comprises a pair of annular beads, and at least one carcass ply wrapped around the annular beads, a tread disposed over the at least one carcass ply in a crown area of the tire. Sidewalls are disposed over the carcass ply between the tread and the beads. The tread comprises a center rib, shoulder lugs and center lugs disposed between the shoulder lugs and the center rib. The tread has a footprint net-to-gross ratio of 60% to 68% and two annular aquachannels each having a width of about 10% to 12% (as measured from tangents on the curve of the aquachannel walls adjacent to the land area of the lug) of total tread width based on the design of the tire, and a depth of 90% to 100% of total tread depth, and two circumferential grooves each having a width of 3% to 5% of the tread width based on the design width of the tread.

The illustrated tire may be viewed as having a tread having two aqua-tread portions, each aqua-tread portion comprising an aquachannel disposed between two circumferential rows of lugs, wherein the width of the aquachannel comprises 15% to 25% of the width of each aqua-tread portion. In various embodiments of the invention, the aquachannel may be symmetrical in cross section, and the aqua-tread portions may be substantially symmetrical within said tread, or the aqua-tread portions may be different, which causes asymmetry within the tread. In the illustrated embodiment, the aquachannel comprises 20% to 24% of the width of each aqua-tread portion.

In one embodiment of the invention, the tire has a tread wherein the shoulder lateral grooves and the center lateral grooves are angled in the same direction.

In an alternative embodiment, the shoulder lateral grooves and the center lateral grooves are angled in opposed directions.

In an illustrated embodiment, the shoulder lateral grooves and the center lateral grooves are angled in the same direction and have the same angle with respect to the EP of the tire on both sides of the center rib, the center lateral grooves are not continuous with the shoulder lateral grooves, and the aquachannels separate the shoulder lugs from the center lugs.

Also in an illustrated embodiment, the shoulder lugs are continuous with center lugs in a minimal tread depth within the aquachannel.

Other embodiments may comprise tires in which the tread pattern is directional, or the tread pattern is non-directional, or the tread has different rubber compositions axially disposed in different circumferential zones of the tire, or the tread comprises a blend of a rubber composition showing good treadwear and a rubber composition showing good traction.

In the illustrated embodiment, the tire has circumferential reinforcement comprising high tensile steel wire and a footprint factor of 1.05 to 1.25 wherein the footprint is wider than it is long, and the tire has an apex extending substantially to the midsection height of the tire.

DETAILED DESCRIPTION OF THE INVENTION

Figure 1:
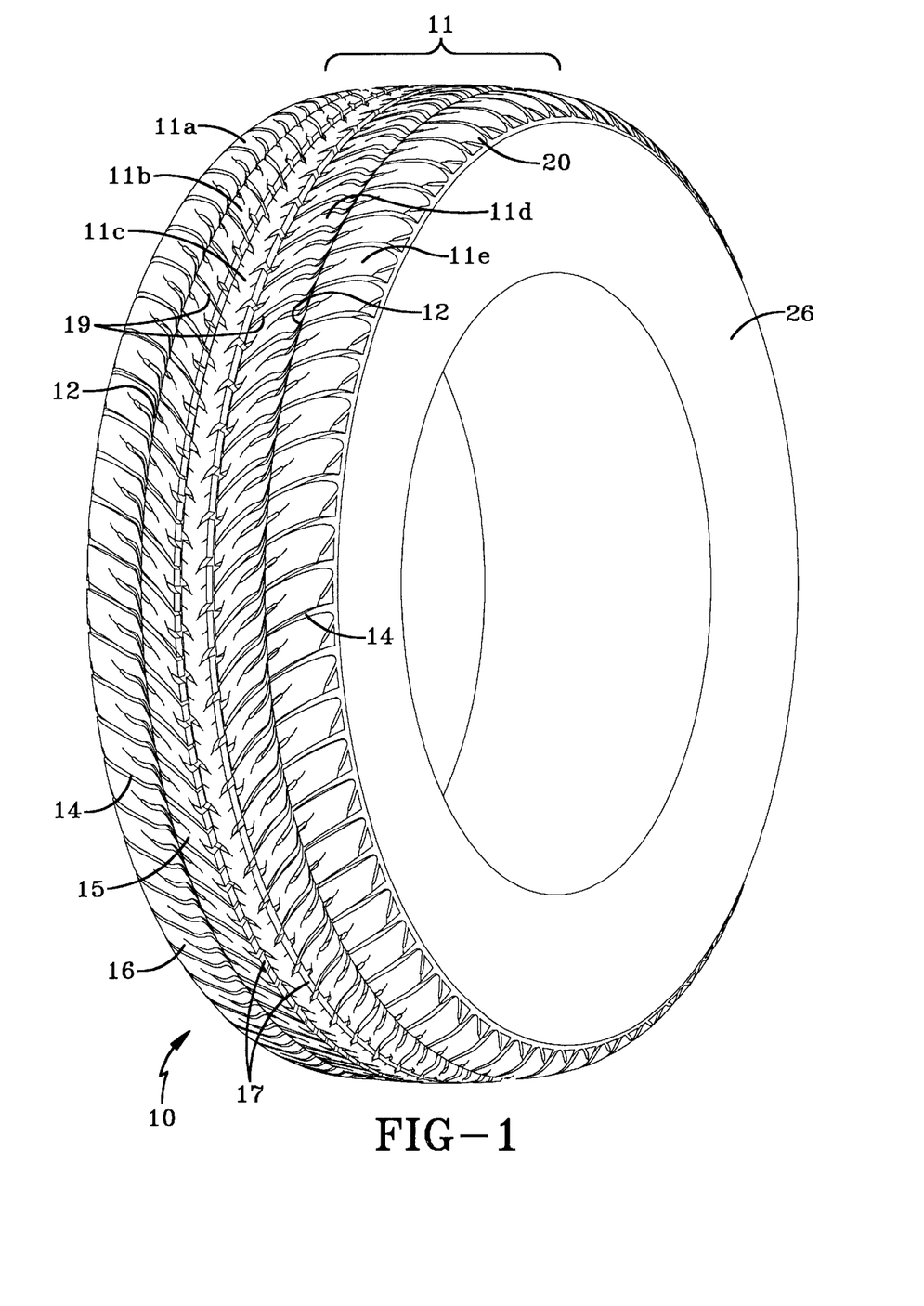
FIG. 1 is a frontal view of one embodiment of a tire of the invention.

With reference now to FIG. 1, the illustrated tire (10) has a tread portion (11) which is divided into five circumferentially extending parts, (11a, 11b, 11c, 11d and 11e) by aquachannels (12) and circumferential grooves (17). In the illustrated embodiments, tread portion (11c) is a center rib, and curved lateral grooves (14,19) traverse aquachannels (12) and take a slanted or arcuate path in a direction away from rib (11c) toward shoulder (20). The aquachannels (12) and circumferential grooves (17) intersect lateral grooves (14,19) and form center lugs (15) and shoulder lugs (16). The tires of the invention are designed primarily for use on paved surfaces.

The tire (10) may be viewed as having a tread which comprises two aqua-tread portions (C and D) (FIG. 3), wherein an aqua-tread portion is defined by an aquachannel disposed between two circumferential rows of lugs. In the tire of the invention, the width of the aquachannel comprises 13% to 25% of the width of each aqua-tread portion, preferably 15% to 17% of the width. The aqua-tread portions may be symmetrical or asymmetrical within the tire tread.

By symmetrical it is meant that the two aqua-tread portions have the same width, the aquachannels therein have the same width, and the aquachannels are disposed at the mid-point of the aqua-tread portions and the aqua-tread portions are equally spaced with regard to the centerline of the tread.

By asymmetrical it is meant that any of these parameters, i.e. the width of the aqua-tread portions, the width of the aquachannels, or the location of the aquachannels or the aqua-tread portions with respect to the mid-point of the aqua-tread portions or the centerline of the tread may be different in the same tire tread.

Figure 3:
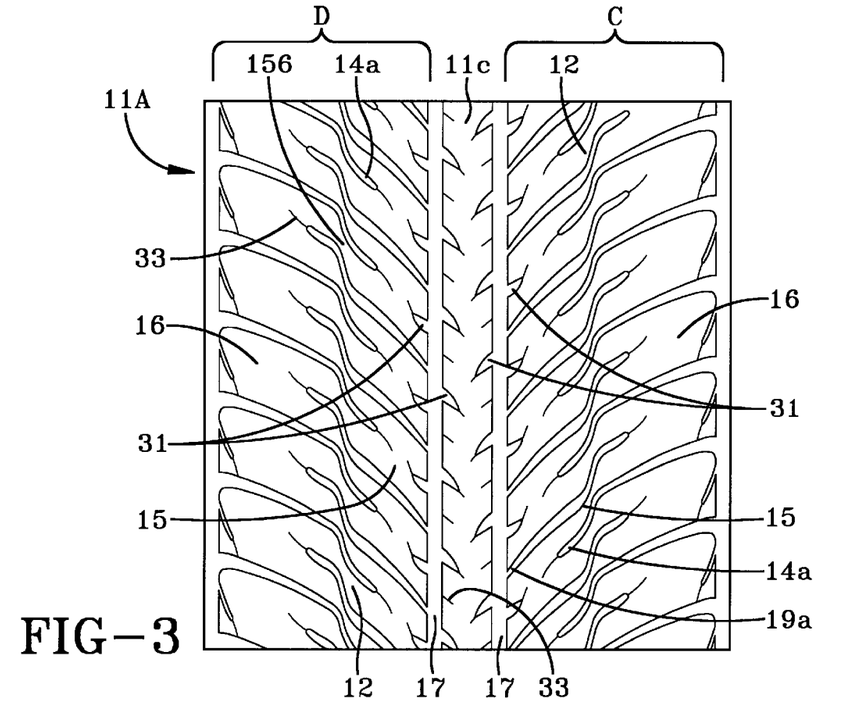
FIG. 3 illustrates a top view of a portion of the tread of the tire.

In the illustrated embodiment, the aquachannel comprises about 22% of the width of the aqua-tread portions, and the aqua-tread portions are substantially symmetrically disposed in the tire tread.

In a preferred embodiment, the lateral grooves (19) will have an angle of 35°–50°, preferably 40°–43° with respect to the EP of the tire, and lateral grooves (14) will have an angle of 55°–70°, preferably 62°–65° with respect to the EP of the tire.

When driving on wet roads, the passing of the lateral grooves (14) through the aquachannels substantially facilitates the flow of water out of the contact patch of the tire footprint. In a directional tread pattern, water can flow through lateral groove (19) into the aquachannel (12), or from the aquachannel (12) through lateral groove (14) toward the shoulder (20). Water not expelled through the shoulder is trapped in the aquachannels. Either way, the water is removed from the contact patch of the tire. These water removal mechanisms help prevent water backpressure from building up in front of the tire, and help maintain rubber contact between the tire and the pavement. Since the aquachannel may be used to trap water, this mechanism works also for non-directional tread patterns.

The rounded shape of the channel provides for smooth flow of water into the channel (12) and for improved lateral traction in the tire. The curvature of the shoulder walls of the aquachannels is similar to the curvature of the shoulder of the tire and in effect, provides additional shoulders for gripping the road, providing improved lateral control and handling properties.

With reference now to FIG. 3, tread (11A) of the tire of the invention is directional since, if the tire is mounted such that a portion (14a, 19a) of the lateral groove enters the footprint first, all water encountered by the tread pattern would be channeled away from, instead of toward the center rib (11c) of the tire, and by reversing the mounting of the tire, the direction of flow can be reversed.

Figure 4:
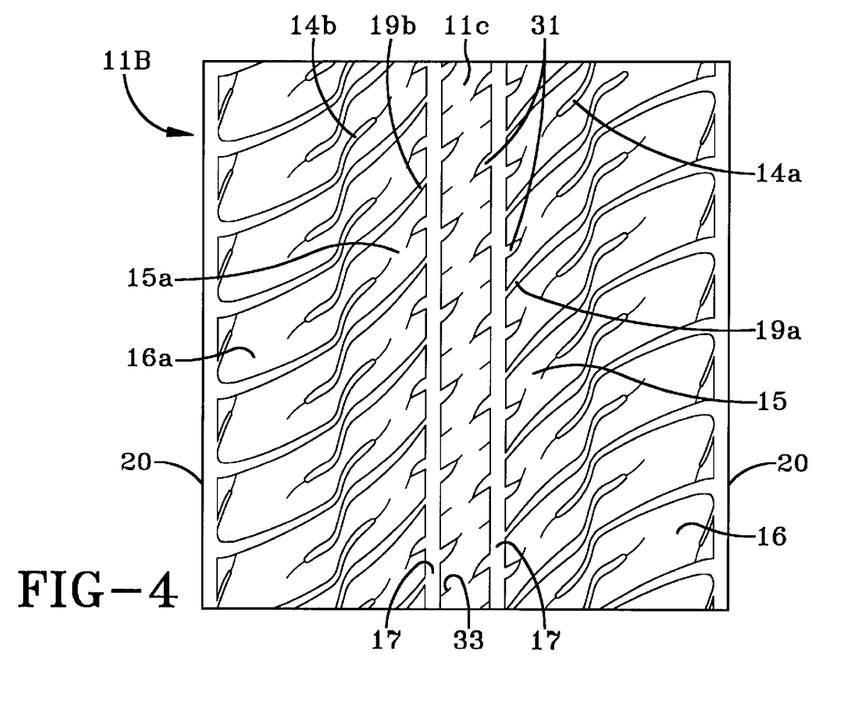
FIG. 4 illustrates an alternative tread pattern of the tire.

In an alternative embodiment, as illustrated in FIG. 4, a tire of the invention may be made with a non-directional tread (11B). The tread pattern of FIG. 4 is non-directional since lateral groove portions (14a, 19a) on one side of the tread direct water toward the center 11c of the tire, and lateral groove portions (14b, 19b) on the other side of the tire direct water toward the shoulder (20) of the tire. And a similar water flow pattern exists regardless of how the tire is mounted.

A tire with a center rib has the advantages that the tire, since most of the pressure is on the center of the tire, has a continuous, pressure bearing, locus of points in contact with the road. This reduces noise and causes a smoother ride on smooth pavement.

In the illustrated embodiment, the pattern of center lugs (15) and shoulder lugs (16) is continuous through aquachannel (12), and notwithstanding their separation by aquachannel (12), may be viewed as one continuous lug that has a minimal tread depth connection within the aquachannel (12), or as axial tie bars (156), which increase the lateral stiffness of the tire and its lateral stability.

In the preferred embodiment, the tires of the invention are siped to improve traction and increase the flexibility of the tread. Tread block sipes are preferably parallel to or in line with lateral grooves.

The center rib (11c) of the tire of the invention is bladed (siped) and has notches (31) to increase grip, reduce heat build-up and to provide a pleasing design. In the illustrated embodiment, notches (31) complement sipes (33) on opposed sides of rib (11c).

Figure 2:
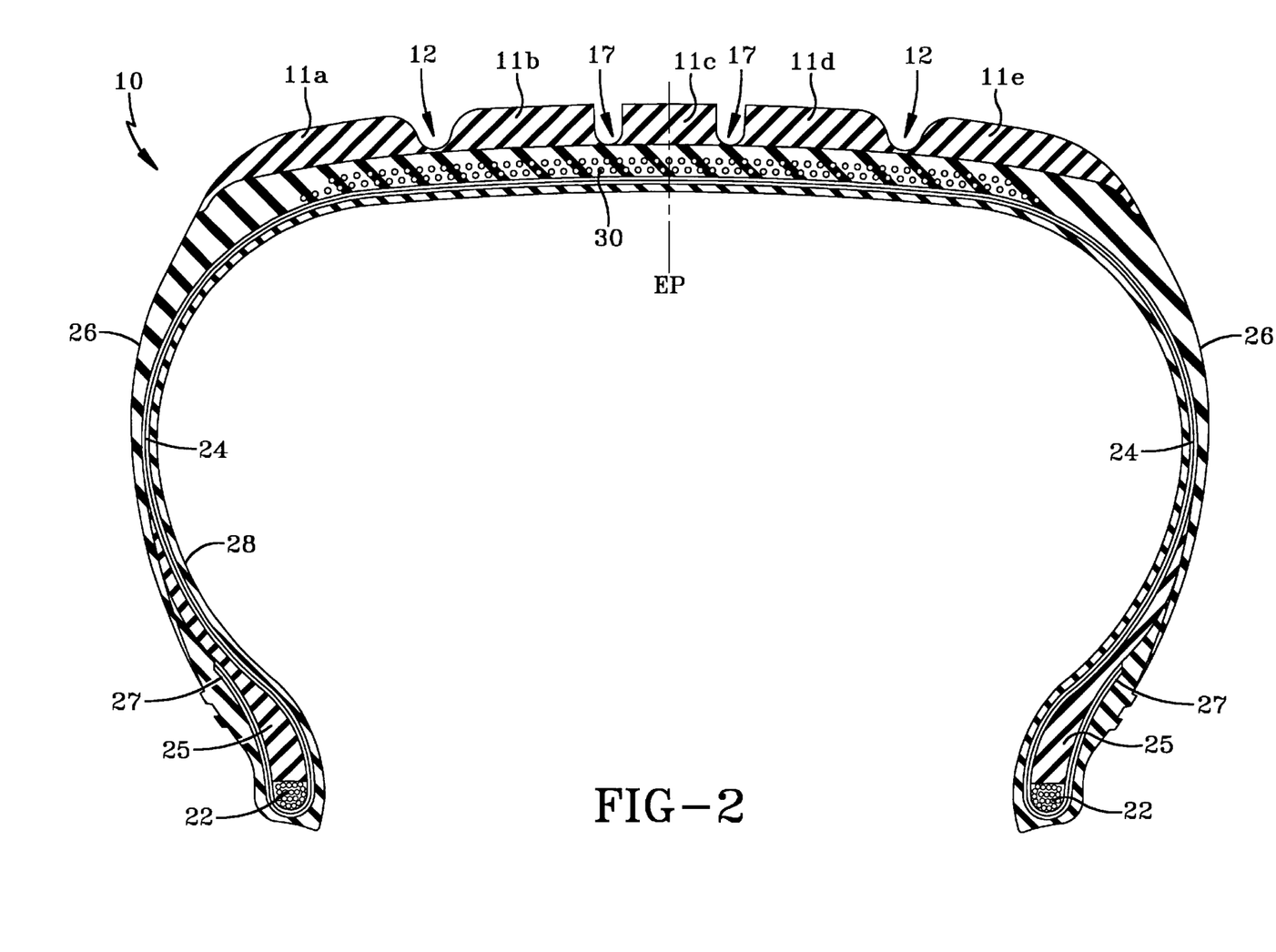
FIG. 2 is a cross section view of a tire of the invention.
Figure 2A:
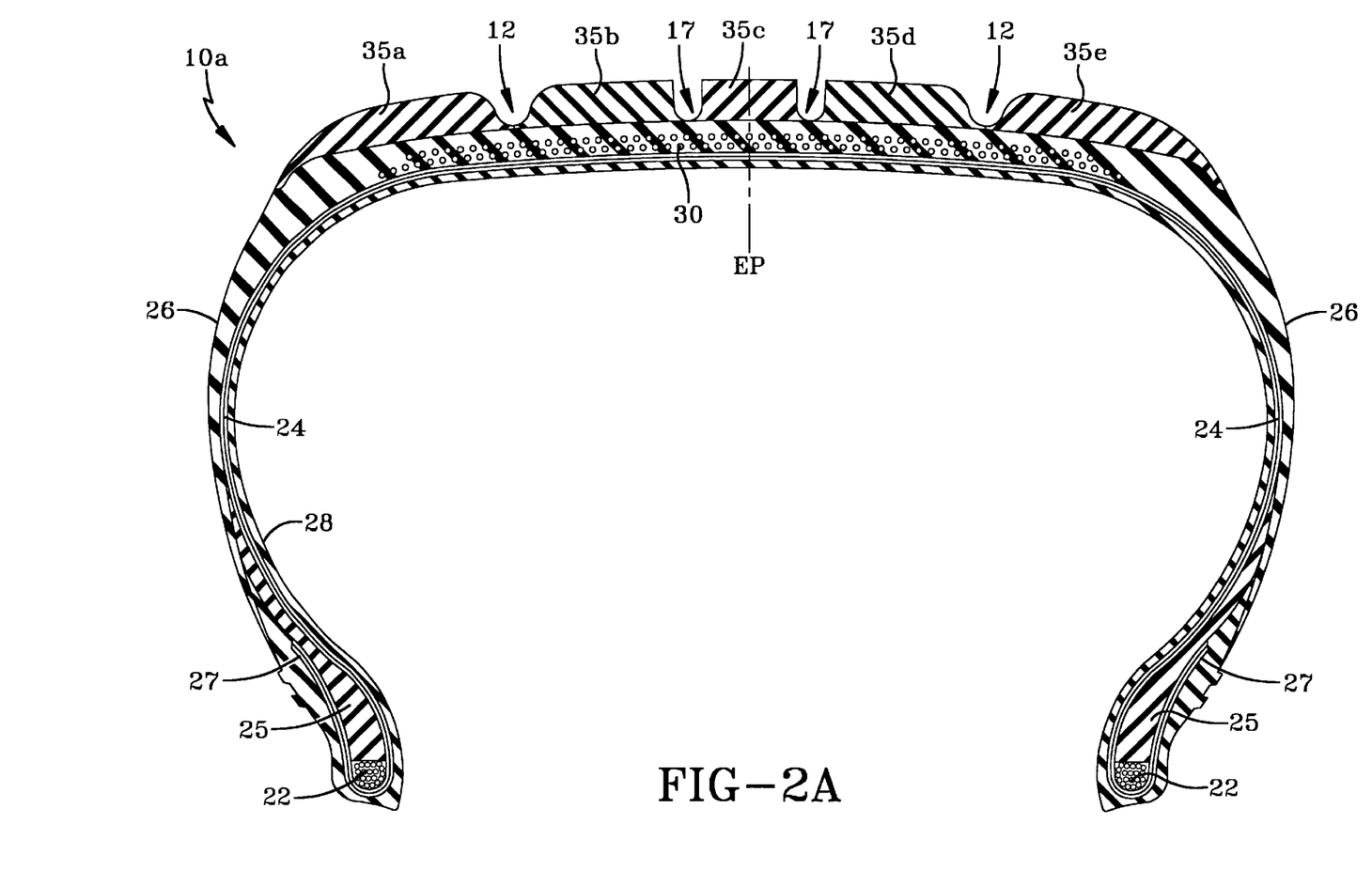
FIG. 2A illustrates a cross section view of an alternative embodiment of the tire.

With reference to FIGS. 1, 2, and 2A, illustrated tires of the invention comprise a pair of annular beads (22), at least one carcass ply (24) wrapped around the beads, a tread (11, 11A) disposed over the at least one carcass ply in a crown area of the tire, and sidewalls (26) disposed between the tread and the beads. The tread may be directional and has a design net-to-gross ratio of 60% to 68% and two annular aquachannels each having a width of about 10% to 12% (as measured from a tangent on the curve of the aquachannel wall adjacent to the land area of the lug) of total tread width based on the design tread width of the tire. The aquachannels have a depth of 90% to 100% of the total tread depth. By total tread depth it is meant the distance from the tread base to the land area of a lug. In the illustrated embodiment the net-to gross ratio is about 65%, the design width of each aquachannel is about 11% of the tread width, and the aquachannel depth is about 94% of the total tread depth.

Figure 6:
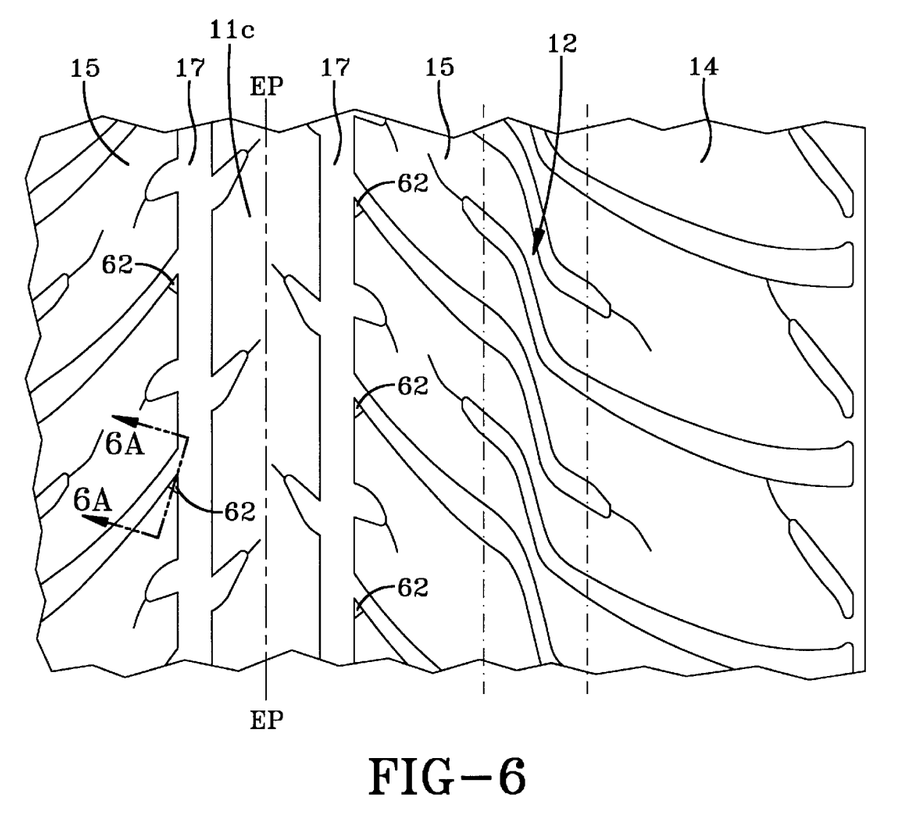
FIG. 6 illustrates a detailed portion of the tread of the tire.
Figure 6A:
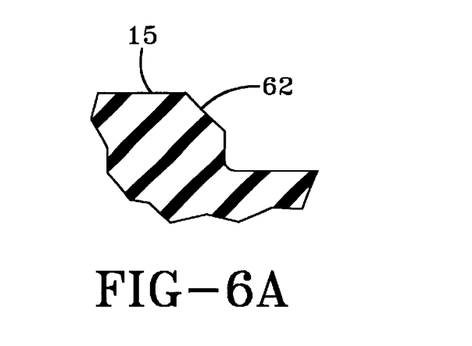
FIG. 6A illustrates a cross section of a chamfer on the leading edge of a block.

With reference now to FIGS. 6 and 6A, in the illustrated embodiment of the tire, the sharp, angled corners of the lugs, especially when they are the leading edge of the lug, have chamfers (62), which are believed to improve the irregular wear properties of the tire. The chamfers are also believed to prevent loss of the corners in the mold when the tire is removed from the mold after curing.

Scribe lines are also provided at the center of the tire and in the shoulder lugs to improve the manufacturing process. The scribe lines affect the appearance of the tire, but do not affect the properties of the tire.

The solid shoulder blocks (16) in the tire are believed to be beneficial for the handling properties and the grip of the tire.

Those skilled in the art will recognize that differences in load and distortion of tread rubber may cause slight variations in the net-to-gross and aquachannel width in a tire footprint. It is believed that the invention will demonstrate the improved properties described when the footprint net-to-gross is 58% to 70%, and the width of each of the aquachannels is 8% to 14% of the footprint width.

The illustrated tire of the invention has a footprint factor of about 1.20. See FIG. 5. It is believed that the improved properties observed in the tire will be retained when the footprint factor is in the range of 1.05 to 1.25. The footprint factor is the ratio of the footprint length at the center of the tire to the footprint length at the shoulder of the tire, as defined by Hubbell, et al. in U.S. Pat. No. 5,733,393, said patent being incorporated herein by reference.

As is illustrated in the Hubbell, et al patent, and by "Mechanics of Pneumatic Tires", a publication of the U.S. Department of Transportation, as well as other publications, the footprint of a tire is influenced by the carcass construction of the tire, the materials and the end count and cord angles of the crown reinforcement, the hardness of the tread rubber, the flexibility of the sidewalls, the length of the carcass turnup, the length of the carcass cords, the width of the crown reinforcement, the mold shape of the tire, as well as the number of carcass plies and the angle of the carcass ply reinforcement, the load, and the size of the tire. Those skilled in the art will be able to achieve the footprint factor of the invention by adjusting these parameters for particular tire constructions.

The tire of the invention may be made to utilize a 13 pitch sequence, an RPAH sequence or any other pitching that is found to be acceptable for a given road surface or purpose. In the illustrated embodiment, a PJW@4W pitch sequence, as defined by Wesolowski in U.S. Pat. Nos. 5,743,974; 5,753,057; 5,759,310 and 5,759,312; is used.

Pitching, as it relates to tires, is well characterized by the prior art, as illustrated by U.S. Pat. No. 4,474,223 to Landers, and references cited therein, and references in which the patent is cited.

With reference now to FIGS. 2 and 2A, the carcass of the tire may comprise a turnup ply (27) and a high apex (25) to improve the stiffness of the tire sidewall.

In the illustrated tire of the invention, the carcass construction is the same as that used in a commercial tire known as the REGATTA 2. The carcass has one polyester carcass ply (24) wrapped around beads (22), and an apex (25) that extends substantially to the midsection height of the tire. Apex (25) is sandwiched between the body of carcass ply (24) and its turnup (27). An optional inner liner (28) is disposed over the at least one carcass ply (24) in the cavity of the tire.

In the illustrated embodiment of the invention, circumferential reinforcement (30) comprises two high tensile steel (hts) belts. Those skilled in the art will recognize that other circumferential reinforcement, including conventional steel belts with overlays, as well as other suitable constructions, may be used in the tire construction of the invention, if tensile properties and modulus of the belt reinforcement substantially equivalent to or surpassing the hts reinforcement can be achieved.

In the embodiment of FIG. 2, tread sections (11a, 11b, 11c, 11d and 11e) comprise the same tread compound. In the alternative embodiment shown in FIG. 2A, a zoned tread is illustrated. That is, tread portions (35a, 35c and 35e) are made of a tread rubber designed for, e.g., wear properties, and tread portions (35b and 35d) are made of a tread rubber designed for, e.g., traction properties. Such a zoned tread is believed to increase both the wear properties and the traction properties of a tire.

In an alternative embodiment, which may also be illustrated by FIG. 2, the inventors have found that by blending a tread compound designed for wear with a tread compound designed for traction, that in the particular tread design of the illustrated tire, both the wear properties and the traction properties of the tire are improved.

The tread compound used in the illustrated tire of the invention comprises a 70/30 blend of emulsion SBR (styrene/butadiene rubber) and BR (butadiene (natural) rubber) which includes 80 phr carbon black and 46 phr oil. This rubber formulation is the same as that used in the tread of commercial "touring" tires, where treadwear is important, except that the treadwear compounds use about 70 phr carbon black and about 44 phr oil. By comparison, a typical traction compound, used in high performance tires, for example, uses the same tread formulation except for the use of about 90 phr carbon black and about 48 phr oil.

The tread rubber is prepared as is conventional in the art using conventional initiators and accelerators. Similar rubber compositions, differing by the amount of oil and carbon black used in the composition, and the specific ratio of the particular rubbers used, are illustrated in U.S. Pat. No. 5,319,026, said patent being incorporated herein by reference.

The inventors believe that the improved properties seen in the tires of the invention will be maintained, in various proportions, if the tread rubber formulations contain 75 to 85 phr carbon black, and 45 to 47 phr oil.

In tread wear tests, the experimental tire of the invention exceeded the requirements for an 80,000 mile tread wear warranty.

In stopping tests, the tire of the invention demonstrated wet stopping of 136.4 feet from 45 mph and dry stopping of 122.2 feet from 60 mph, as compared to the control (AQUATRED® II) tire's wet stopping of 149.3 feet and dry stopping of 137.2 feet from the same speeds.

The tire also rated better for wet handling, 105% as compared to AQUATRED® II control and had a better wet track lap time (by 0.68 sec.) and better dry track lap time (by 0.75 sec.), than the AQUATRED® II control.

In snow traction tests, a tire with the directional tread pattern rated 85% of the AQUATRED® II control. Tires with the non-directional tread pattern rated better than the AQUATRED® II control tire.

Figure 5:
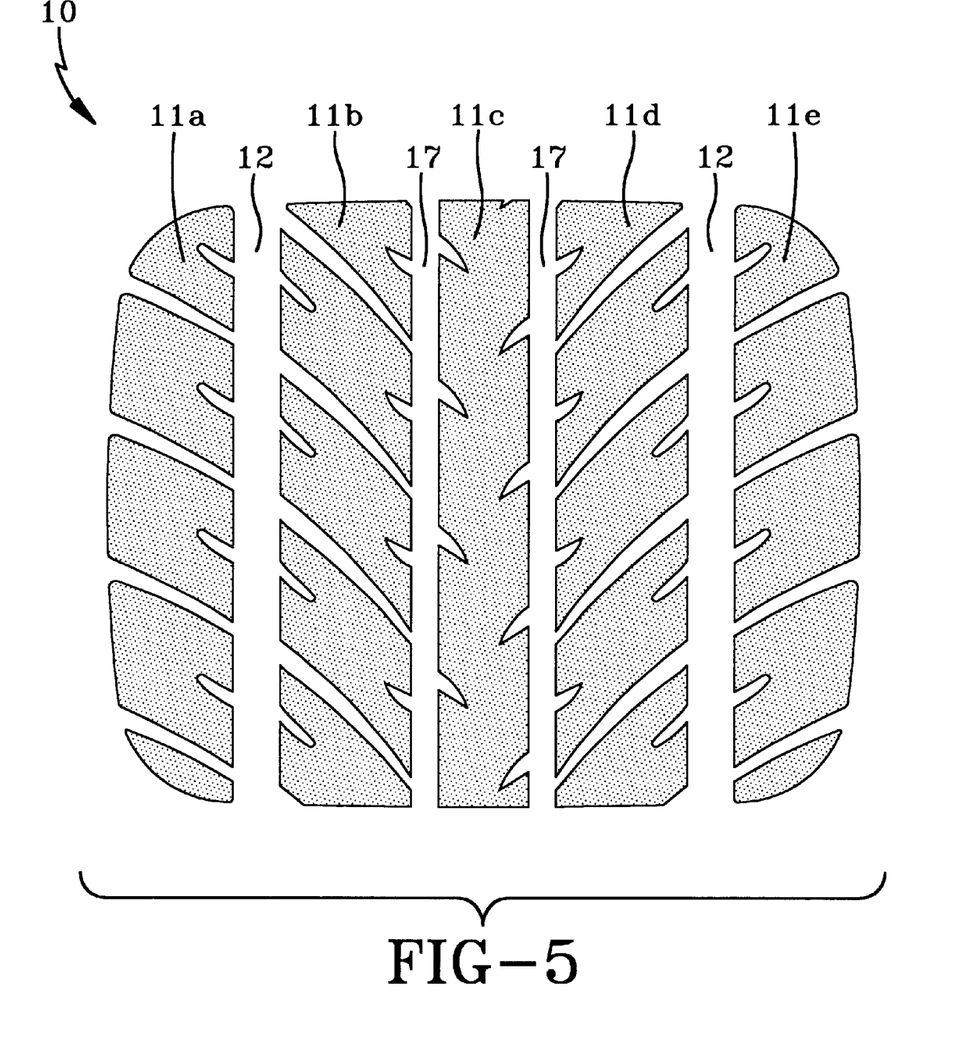
FIG. 5 illustrates a representation of a footprint of the tire of the invention.

With reference now to FIG. 5, a footprint of a tire of the invention, as illustrated in FIGS. 1, 2 and 3, shows an overall square shape. The square shape footprint is believed to provide better handling, and the relatively wide footprint is believed to contribute to the improved traction observed in the examples below. The wide channels (aquachannels 12) are located approximately 35% of the distance from the shoulder to the EP of the tire (nearer the shoulder). The relationship and proportions of the shoulder lugs and center lugs and aquachannel (12) on each side of the tire are similar to the width proportion and relationship of the two halves of the tire in the original AQUATRED® tire, U.S. Pat. No. 5,176,766, said patent being incorporated herein by reference. It is believed that the aquachannels (12) and lateral grooves (14,19) accommodate the water encountered by the shoulder lugs (16) and the center lugs (15), and the central circumferential grooves (17) accommodate the water encountered by center rib (11c).

The footprint is wider than it is long, and the footprint length may be 75% to 85% of the footprint width. In the illustrated embodiment, the footprint length is about 80% of the footprint width.

The invention is further illustrated with reference to the following examples. It should be noted that the data provided is for experimental tires, and slightly better or slightly worse performance may be seen in production tires that are built under different conditions. The data is provided to show positive or negative changes in trends.

EXAMPLE 1

A tire of the invention, having a directional tread pattern, was tested for QGL wet traction on various road surfaces. The results are described in Table 1 using a Goodyear control and tires from two different competitors for comparison. Higher numbers are better. The results show that the experimental tire matched the best control tire for QGL traction, and beat all the control tires for hydroplaning properties.

The data represents a factor determined by comparing test tires with a standard control tire, and do not have any units.

TABLE 1

| Wet Traction Target: QGL AA Rating | Concrete | Macadam |
|---|---|---|
| QGL Minimum | .380 AA | .540 AA |
| AQUATRED ® 3 | .383 AA | .571 AA |
| Goodyear Control | .370 A | .530 A |
| Competitor 1 | .383 AA | .561 AA |
| Competitor 2 | .367 A | .538 A |

EXAMPLE 2

Wet traction trailer testing was carried out on the same tires tested in Example 1. The results shown in Table 2 show that the tire of the invention was equivalent to slightly better than the control tires for peak traction, and equivalent to slightly down for slide traction.

The data in the table is normalized data where the control equals 100.

TABLE 2

| Wet Traction (M) (Traction Trailer Testing): | | | | |
|---|---|---|---|---|
| Peak Traction | 20 mph | 40 mph | 60 mph | Ave. |
| AQUATRED ® 3 | 104 | 106 | 106 | 105 |
| Goodyear Control | 100 | 100 | 100 | 100 |
| Competitor 1 | 100 | 105 | 102 | 102 |
| Competitor 2 | 92 | 91 | 87 | 90 |
| Slide Traction | | | | |
| AQUATRED ® 3 | 99 | 102 | 96 | 99 |
| Goodyear Control | 100 | 100 | 100 | 100 |
| Competitor 1 | 101 | 108 | 112 | 107 |
| Competitor 2 | 97 | 105 | 100 | 101 |

EXAMPLE 3

Trailer tests were also run to test the dry traction of the tires tested in Example 2. The results shown in Table 3 illustrate that the tire of the invention matched or beat the comparison tires in the dry traction peak and slide tests.

As in Table 2, the data is normalized with respect to the control.

TABLE 3

Dry Traction (M) (Traction Trailer Testing):

| Peak Traction | 40 mph |
|---|---|
| AQUATRED ® 3 | 106 |
| Goodyear Control | 100 |
| Competitor 1 | 105 |
| Competitor 2 | 98 |
| Slide Traction | |
| AQUATRED ® 3 | 99 |
| Goodyear Control | 100 |
| Competitor 1 | 93 |
| Competitor 2 | 87 |

EXAMPLE 4

In the straight hydroplaning test, a vehicle is run over a glass plate at various speeds, and the tire is photographed through the glass plate. The photographs of the tires are analyzed to determine the percentage of contact and the area of contact between the tire and the glass plate. These determinations are a measure of how much of the tire is lifted by water backpressure against the tire at the various speeds.

Table 4 illustrates that the tire of the invention is clearly better than the control tire (AQUATRED® II) in straight hydroplaning.

TABLE 4

Straight Hydroplaning (M):

| | Goodyear Control | AQUATRED ® 3 |
|---|---|---|
| Percent of Footprint | | |
| 1 mph | 100.0 | 100.0 |
| 40 mph | 74.0 | 84.5 |
| 50 mph | 67.5 | 73.5 |
| 60 mph | 63.5 | 70.0 |
| 70 mph | 57.0 | 65.7 |
| 80 mph | 50.5 | 59.5 |
| Area of Footprint (sq. cm.) | | |
| 1 mph | 145 | 140 |
| 40 mph | 107 | 118 |
| 50 mph | 98 | 103 |
| 60 mph | 92 | 98 |
| 70 mph | 83 | 89 |
| 80 mph | 73 | 83 |

EXAMPLE 5

In the curved hydroplaning test, the lateral G's (gravities) on the vehicle are measured as the vehicle takes a curve in standing water. The lateral G's as the vehicle straightens out of the curve is a measure of how well the vehicle handles in the water. Lower lateral G's indicate better handling properties of the vehicle.

Table 5 illustrates that the tire of the invention is slightly down as compared to the Goodyear Control (AQUATRED® II) in curved hydroplaning.

TABLE 5

Curved Hydroplaning (S):

| Entry/Exit Lateral G's | Goodyear Control | AQUATRED ® 3 |
|---|---|---|
| 60 kph | .28/.24 | .28/.24 |
| 65 kph | .33/.27 | .33/.25 |
| 70 kph | .39/.30 | .39/.27 |
| 75 kph | .44/.31 | .44/.29 |
| 80 kph | .50/.27 | .50/.25 |
| 85 kph | .57/.21 | .57/.18 |
| 90 kph | .64/.12 | .64/.11 |
| Percent Lateral G's Retained | | |
| 60–90 kph | 54.6% | 50.8% |
| 70–90 kph | 42.3% | 38.6% |
| 90 kph | 18.8% | 17.2% |

EXAMPLE 6

One of the main causes of tire wear and damage is stone retention. A tire with low stone retention will usually have better overall wear, and will be less prone to stone drilling than tires with high stone retention.

Table 6 illustrates that the tire of the invention is less prone to pick up stones than the Goodyear control tire (AQUATRED® II), and although the percentage of stones retained after 60 miles on the highway (after 9 miles of gravel) is higher, the total number of stones retained is much less than the control.

TABLE 6

S38 Stone Retention (D):

| Stones Held After 9 Miles Gravel | Goodyear Control | AQUATRED ® 3 |
|---|---|---|
| LF | 4 | 6 |
| RF | 5 | 4 |
| LR | 38 | 23 |
| RR | 105 | 29 |
| Total | 212 | 62 |
| Stones Held After 60 Miles Highway | | |
| LF | 0 | 0 |
| RF | 0 | 0 |
| LR | 23 | 16 |
| RR | 30 | 19 |
| Total | 53 | 35 |
| % Stones Held | 25% | 56% |

While specific embodiments of the invention have been illustrated and described, it will be recognized by those skilled in the art that the invention may be variously modified and practiced without departing from the spirit of the invention. The invention is limited only by the following claims.

What is claimed is:

1. A pneumatic tire for use on paved surfaces comprising a pair of annular beads, at least one carcass ply wrapped around said annular beads, a tread disposed over said at least one carcass ply in a crown area of said tire, and sidewalls disposed between said tread and said beads, said tread comprising shoulder lugs and center lugs, wherein the shoulder lugs are separated by shoulder lateral grooves and the center lugs are separated by center lateral grooves with the center lateral grooves terminating in the shoulder lugs and the shoulder lateral grooves terminating in the center lugs, where an aquachannel separates said shoulder lugs from said center lugs, said tread having a footprint net-to-gross ratio of 60% to 68% and said aquachannel having a width of about 10% to 12% of the total tread width based on a design width of the tread, and a depth of 90% to 100% of total tread depth, and the tread further comprising two circumferential grooves each having a width of 3% to 5% of the tread width based on the design width of the tread, and wherein said tire has a footprint that is wider than it is long.

2. A pneumatic tire for use on paved surfaces comprising a pair of annular beads, at least one carcass ply wrapped around said annular beads, a tread disposed over said at least one carcass ply in a crown area of said tire, and sidewalls disposed between said tread and said beads, said tread comprising a center rib, shoulder lugs and center lugs disposed between said shoulder lugs and said center rib, wherein the shoulder lugs are separated by shoulder lateral grooves and the center lugs are separated by center lateral grooves, where an aquachannel (12) separates said shoulder lugs from said center lugs, and wherein said shoulder lugs are continuous with said center lugs in a minimal tread depth within said aquachannel, the center lateral grooves terminating in the shoulder lugs and the shoulder lateral grooves terminating in the center lugs, said tread having a footprint net-to-gross ratio of 60% to 68% and said aquachannel having a width of about 10% to 12% of the total tread width based on a design width of the tread, and a depth of 90% to 100% of total tread depth, and the tread further comprising two circumferential grooves each having a width of 3% to 5% of the tread width based on the design width of the tread, and wherein said tire has a footprint that is wider than it is long.

3. The tire of claim 2 wherein said shoulder lateral grooves and said center lateral grooves are angled in the same direction.

4. The tire of claim 2 wherein said shoulder lateral grooves and said center lateral grooves are angled in opposed directions.

5. The tire of claim 2 wherein said shoulder lateral grooves and said center lateral grooves are angled in the same direction and have the same angle with respect to the equatorial plane of the tire on both sides of the center rib (11*c*).

6. The tire of claim 2 in which said tread is directional.

7. The tire of claim 2 in which said tread is non-directional.

8. The tire of claim 2 in which said tread has different rubber compositions axially disposed in different circumferential zones of said tire.

9. The tire of claim 2 which has circumferential reinforcement comprising high tensile steel wire.

10. The tire of claim 2 having a footprint factor of 1.05 to 1.25.

11. The tire of claim 2 having an apex extending substantially to the midsection height of said tire.

12. The tire of claim 2 wherein the aquachannel is symmetrical in cross section.

13. The tire of claim 2 wherein the tread has two aqua-tread portions and said aqua-tread portions are substantially symmetrical within said tread.

14. The tire of claim 2 wherein the tread has two aqua-tread portions and said aqua-tread portions are different, which causes asymmetry within said tread.

15. The tire of claim 2 wherein the tread comprises a rubber composition comprising 75 to 85 parts per hundred rubber of carbon black and 45 to 47 parts per hundred rubber of oil.

\* \* \* \* \*